United States Patent [19]

Ogawa

[11] Patent Number: 5,693,914
[45] Date of Patent: Dec. 2, 1997

[54] DIGITIZER AND METHOD OF DETECTING POSITIONS

[75] Inventor: Yasuji Ogawa, Otonemachi, Japan

[73] Assignee: Wacom Co., Ltd., Saitama-ken, Japan

[21] Appl. No.: 517,241

[22] Filed: Aug. 21, 1995

[30] Foreign Application Priority Data

Feb. 28, 1995 [JP] Japan .................................. 7-064666

[51] Int. Cl.$^6$ .............................. G08C 21/00; G09G 5/00
[52] U.S. Cl. ................ 178/19; 178/18; 345/173; 345/179
[58] Field of Search ................ 178/18, 19; 379/20; 345/173, 174, 179, 180, 156

[56] References Cited

U.S. PATENT DOCUMENTS

| | | | |
|---|---|---|---|
| 5,070,217 | 12/1991 | Kabayashi et al. | 178/18 |
| 5,130,500 | 7/1992 | Murakami et al. | 178/18 |
| 5,440,080 | 8/1995 | Nagaoka et al. | 178/18 |
| 5,466,895 | 11/1995 | Logan | 178/18 |
| 5,557,076 | 9/1996 | Wieczorek et al. | 178/19 |
| 5,567,920 | 10/1996 | Watanabe et al. | 178/18 |

Primary Examiner—Curtis Kuntz
Assistant Examiner—Binh K. Tieu
Attorney, Agent, or Firm—Oliff & Berridge

[57] ABSTRACT

A digitizer for use as an input device for a computer system is provided. The digitizer is of the passive type, having a coordinate board for use as an input board which does not include any power sources or active circuit elements. In the coordinate board there is configured a plurality of resonant loop coils along each of two coordinate axes, whose resonant frequencies are mutually different. A position indicating device, exemplified by a hand-held pointer, includes an antenna coil electromagnetically coupled with any of the loop coils disposed in the coordinate board. AC power supplied to the antenna coil has a frequency which is varied to match the resonant frequencies of each of the plurality of loop coils. An AC signal generated by the induction effect due to the electromagnetic coupling is generated in the antenna coil, is outputted to a processing unit, and coordinate values of the position indicating device are calculated based on the output AC signal. Further, a method for detecting positions performed in the digitizer is described.

15 Claims, 9 Drawing Sheets

DIGITIZER AND METHOD OF DETECTING POSITIONS

BACKGROUND OF THE INVENTION

1. Field of the Invention

The present invention relates to a digitizer and a method of detecting positions for the digitizer, and more particularly to a digitizer having a passive-type board unit with an X and Y coordinates plane defined thereon and a position indicating device operated on the board unit, which provides coordinate data of points to a computer system when the points are indicated by the position indicating device on the X and Y coordinate plane, and the method of detecting the indicated positions as coordinate data performed in the digitizer.

2. Description of the Related Art

A digitizer that operates as an apparatus for detecting positions is used as a position information input device for a computer system employed as a computer aided design system or a graphics-display computer system. The digitizer is provided with a rectangular plane board on which an X and Y coordinate plane is defined and on which position information can be inputted. A member having such a rectangular plane board is referred to "a coordinate plane board" hereinafter. In the conventional digitizer, there is generally included a coordinate detecting unit having the coordinate plane board, electric circuits, arithmetic processing sections for calculating coordinate data of the positions indicated on the coordinate plane board, and a position indicating device for indicating any positions on the coordinate plane board.

In the conventional digitizer, typically, the position indicating device includes electric circuits and a coil antenna which operate to emit electromagnetic waves of a certain high frequency, and the coordinate detecting unit includes many loop coils which are arranged along each direction of the X and Y axes defined on the X and Y coordinate plane at regular intervals, for example. The X and Y axes intersect at right angles. In such a configuration of the conventional digitizer, when indicating a position on the coordinate plane board suitably by the position indicating device, an electromagnetic wave is emitted from the coil antenna within the position indicating device at the indicated position on the coordinate plane board. Further, the coordinate detecting unit determines two loop coils, which respectively correspond to directions of the X and Y axes and in which the strongest current may flow based on a response to the electromagnetic wave, in order to determine the position indicated by the position indicating device. This indicated position may be determined as an X coordinate value (x) and a Y coordinate value (y). Thus, the conventional coordinate detecting unit was configured so that the indicated position on the coordinate plane board can be detected as coordinate values by detecting a current intensity in each of several loop coils in respective directions of the X and Y axes, or as phase differences among the currents flowing in the loop coils.

In the typical conventional digitizer explained above, it is necessary that the position indicating device includes circuit components such as an electric circuit for emitting the electromagnetic waves and a power source further the coordinate detecting unit is additionally equipped with circuit components for detecting the current intensity or the phase differences, for example, of induction currents flowing in the loop coils arranged in the respective directions of the X and Y axes, and a power source used for driving the circuit components. Consequently, the conventional digitizer has the problem that the coordinate detecting unit has a complicated structure, and therefore it is very difficult to manufacture it as a product at a low cost. Further, when a pen-type position pointing device comprises a small-sized computer for executing an applied process by use of the coordinate data (x, y) of the indicated position, or when providing a small-sized display on the rear end of the position indicating device in order to improve the digitizer ease of use, it is required to have a communication system between the coordinate detecting unit and the position indicating device to transmit coordinate data of the positions detected by the coordinate detecting unit to the position indicating device by the communication system, the configuration of the digitizer is more complicated. Therefore, the manufacturing cost become more expensive.

SUMMARY OF THE INVENTION

It is an object of the invention therefore to provide a digitizer of the passive type used as an input device for a computer system, a coordinate plane board of which does not include any power sources or active circuit elements and therefore has a simple configuration, and further to provide a method of detecting positions performed in the digitizer.

The digitizer of the passive type is defined as an apparatus having the coordinate plane board that does not include components for calculating coordinate data but components for providing signals useful for determining the coordinate data. In the digitizer of the passive type, calculating the coordinate data of positions pointed out by a position indicating device is carried out in the position indicating device.

It is another object of the invention is to provide a digitizer configured as a pen-type computer in which a pen-type position indicating device includes a small computer system and further has a display unit of small size, and having portability, high operability, and ease of use.

A digitizer of the present invention comprising: a coordinate board with a two-dimensional coordinate plane defined thereon for use as an input board, there being configured therein a plurality of resonant loop coils along each of two coordinate axes, whose resonant frequencies are mutually different, the loop coils resonating by electromagnetic coupling; a position indicating device including an antenna coil electromagnetically coupled with any of the loop coils, with the position indicating means being operated on the two-dimensional coordinate plane; an AC power supply for supplying the antenna coil with AC power, the frequency of which being varied to match resonant frequencies of each of the plurality of loop coils; a signal detector for detecting an AC signal generated by an induction effect due to the electromagnetic coupling in the antenna coil, thereby sensing a resonant signal in any one of the plurality of loop coils; and, a processing section for controlling operations of the AC power supply and signal detector, and for calculating coordinate values of positions pointed out by the position indicating device on said coordinate board by using signals outputted from the signal detector.

In the digitizer as described above, the plurality of loop coils preferably includes at least three loop coils whose resonant frequencies are mutually different, and which are arranged in a repeating pattern.

In the digitizer, each of the loop coils is connected with a resonator whose resonant frequency is identical with the resonant frequency of the connected loop coil.

In the digitizer, the two coordinate axes are X and Y axes perpendicularly intersecting each other, and the plurality of loop coils are arranged along each of the X and Y axes.

In the digitizer as described above, the frequency of the AC power supplied to the antenna coil is preferably varied sequentially to match the resonant frequency of each loop coil of the plurality of loop coils one after the other.

In the digitizer, a plurality of all frequencies of the AC power that match the resonant frequency of each loop coil of the plurality of loop coils are preferably supplied to the antenna coil simultaneously.

In the digitizer as described above, the AC power supply, the signal detector, and the processing section can be incorporated into the position indicating device.

In the digitizer as described above, the position indicating device contains a computer unit including the processing section, and a display section for displaying the result obtained through processing in the processing section.

A method detecting positions performed in the digitizer, comprising the steps of: moving the position indicating device including an antenna coil on the coordinate plane board in which a plurality of resonant loop coils having respectively a resonating action based on unlike resonance frequencies are arranged along at least one coordinate axis, the antenna coil being able to be electromagnetically coupled with each of the plurality of resonant loop coils; supplying the antenna coil with a plurality of AC signals whose frequencies are respectively identical to resonant frequencies of the plurality of resonant loop coils in order to activate said antenna coil; retrieving an AC signal induced in the antenna coil owing to any one of the plurality of resonant loop coils which performs the resonating action based on the electromagnetic coupling; detecting a state of the induced AC signal; and calculating coordinate values of positions indicated by the position indicating device on the coordinate plane board by using the state of the AC signal.

In the method of detecting positions as described above, each of the plurality of loop coils is preferably connected with a resonator whose resonant frequency is identical with the resonant frequency of the connected loop coil.

In the method of detecting positions as described above, the frequency of the AC signals supplied to the antenna coil is preferably varied sequentially to match the resonant frequency of each resonant loop coil of the plurality of resonant loop coils one after the other.

In the method of detecting positions as described above, a plurality of all frequencies of the AC signals that match the resonant frequency of each resonant loop coil of the plurality of resonant loop coils are preferably supplied to said antenna coil simultaneously.

BRIEF DESCRIPTION OF THE DRAWINGS

A preferred form of the present invention is illustrated in the accompanying drawings in which.

DESCRIPTION OF THE PREFERRED EMBODIMENTS

Some preferred embodiments of the present invention will be explained on the basis of attached figures hereinafter.

Figure 1:
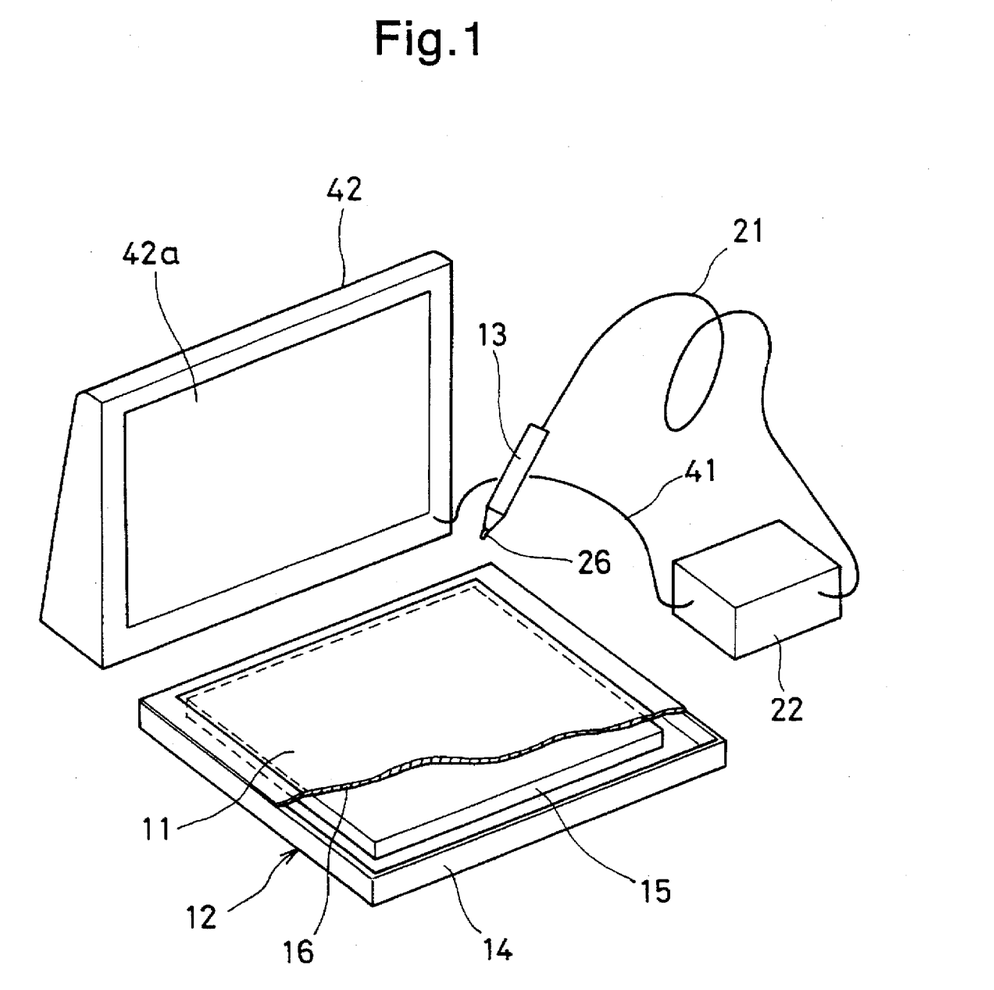
FIG. 1 is a perspective view illustrating a computer system including a digitizer of the present invention.

FIG. 1 illustrates the entire computer system including a digitizer of the present invention. The digitizer of this embodiment is configured to include a coordinate plane board 12 on which an X and Y coordinate input surface 11 is defined, and a pen-type position indicating device 13 used for indicating positions on the X and Y coordinate input surface 11 of the coordinate plane board 12. The X and Y coordinate input surface 11 on the coordinate plane board 12 is defined by X and Y coordinate axes perpendicularly intersecting each other and defines an area on which a position can be indicated by using X and Y coordinate values. The area on the X and Y coordinate input surface 11 is practically shown by drawing a frame line on the coordinate plane board 12. The action of indicating any position on the X and Y coordinate input surface 11 by means of the position indicating device 13 will make it possible to determine both an X coordinate value (x) and a Y coordinate value (y) of the indicated position with a predetermined resolution.

Figure 3:
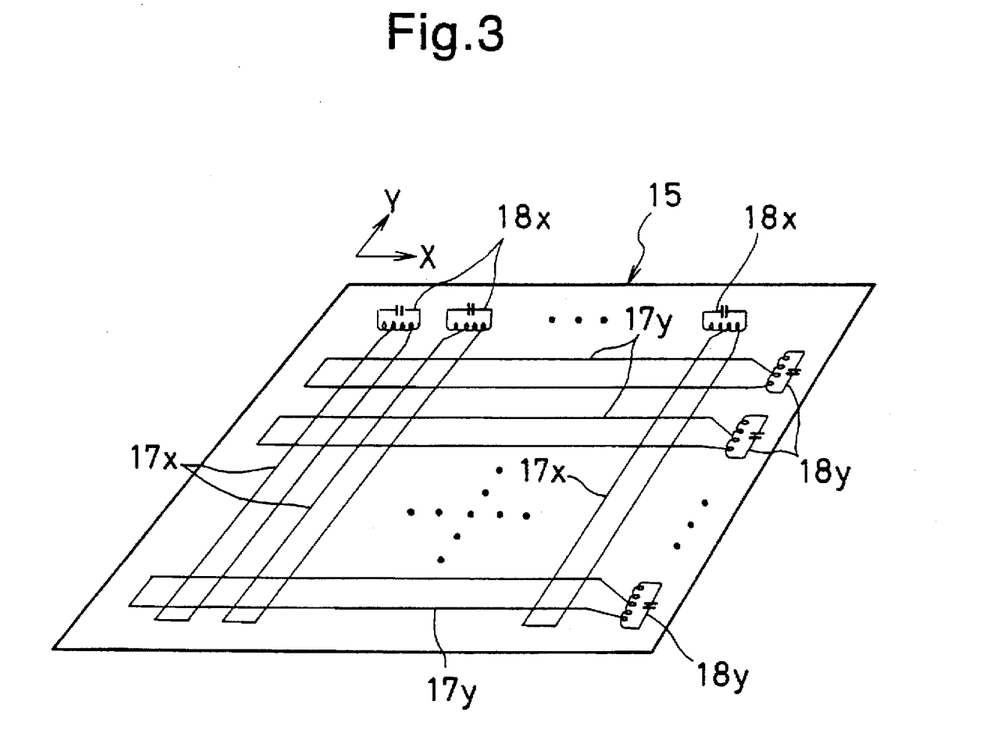
FIG. 3 is a diagrammatic view illustrating an arrangement of loop coils in a coordinate plane board.

The coordinate plane board 12 has a housing 14 in which a resonance unit including a plurality of loop coils is arranged, and the X and Y coordinate input surface 11 is set on an upper plate of the housing 14. As shown in FIG. 3, in the interior space of the resonance unit 15, a plurality of loop coils 17x are arranged along the direction of the X coordinate axis at equal intervals, while a plurality of loop coils 17y are arranged along the direction of the Y coordinate axis at equal intervals. The required number of loop coils 17x and 17y can be determined by the resolution required. Each of a plurality of loop coils 17x is connected with a resonator 18x including a coil and a condenser connected in parallel with the loop coil's opened terminals, and likewise each of a plurality of loop coils 17y is connected with a resonator and a condenser 18y with the loop coil's opened terminals. The plurality of loop coils 17x and 17y, each of which is connected to the corresponding resonator, respectively have a resonating action on the basis of electromagnetic coupling, with the electromagnetic coupling provided by the pen-type position indicating device 13 as explained bellow. Electric circuits respectively comprising the combinations of the resonators 18x and the loop coils 17x have their respective resonant frequencies different from each other. The resonant frequency of the resonator 18x is identical to one of the loop coil 17x connected thereto. Similarly, Electric circuits respectively comprising the combinations of the resonators 18y and the loop coils 17y have their respective resonant frequencies different from each other, and the resonant frequencies of the resonator 18y and the loop coil 17y that are mutually connected are identical.

Further, a plurality of resonators 18x and 18y can be omitted. That is, a plurality of loop coils 17x and 17y respectively can act as a resonator in themselves without the corresponding resonator 18x or 18y. In addition, a shield plate (not shown) is desirably disposed under the resonance unit 15. The shield plate cuts off noise which is emitted from various electromagnetic sources through the table to the coordinate plane board 12 placed thereon, and therefore prevents induction currents due to the noises from flowing in the loop coils.

As shown in FIG. 1, the pen-type position indicating device 13 is connected with a control unit 22 by a cable 21.

Figure 2:
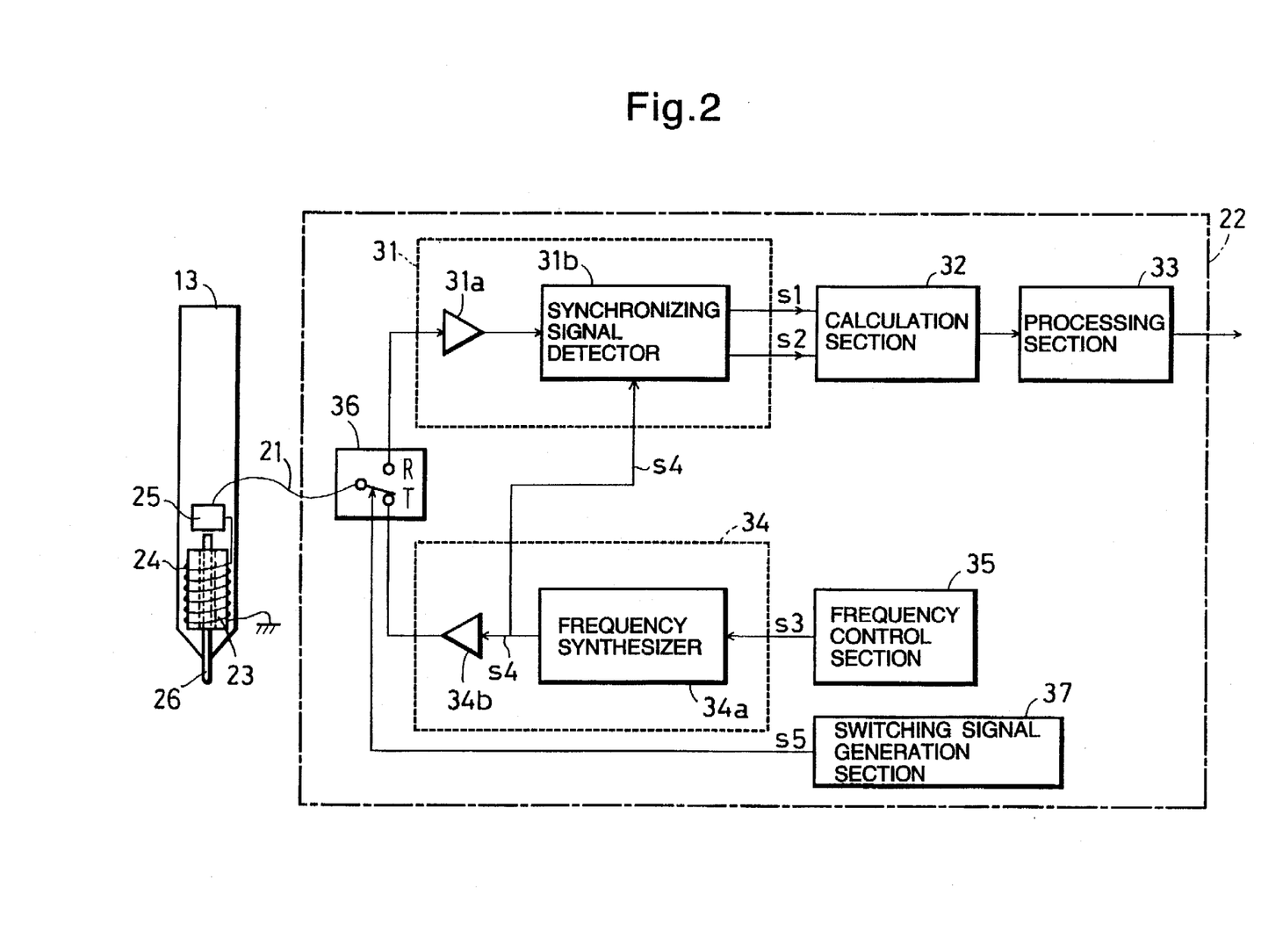
FIG. 2 is a view illustrating internal configurations of a pen-type position indication device and a control unit.

As shown in FIG. 2, the pen-type position indicating device 13 has a pipe-like ferrite core 23 around which a conductive wire is wound with several turns, and one end of the conductive wire is connected with the cable 21 through a switch 25 while another end thereof is grounded. The conductive wire wound repeatedly around the ferrite core 23 acts as both an antenna coil and a sensor coil. Hereinafter, the conductive wire will be called the antenna coil 24. In the interior space of the ferrite core 23, a core shaft 26 is arranged so as to be movable in the direction of the axis of the ferrite core 23. The tip of the core shaft 26 projects from the leading edge of the pen-type position indicating device 13 and the opposite end thereof is in contact with a switch (a contact pressure transducer) 25. When the pen-type position indicating device 13 makes contact at a certain position on the X and Y coordinate input surface 11 of the coordinate plane board 12 with a pressure in order to indicate the position by the position indicating device 13, the switch 25 is switched ON and an AC signal supplied from the control unit 22 through the cable 21 flows in the antenna coil 24. If the AC signal flows in the antenna coil 24, the antenna coil 24 emits an electromagnetic wave at a specific frequency corresponding to the frequency of the AC signal.

As shown in FIG. 2, the control unit 22 comprises a coordinate detecting section 31, a calculation section 32 for calculating coordinate data, a processing section 33 for carrying out necessary processes by using X and Y coordinate data obtained in the calculation section 32 in prepared application programs, a resonance frequency signal generating section 34 for generating a plurality of resonance frequency signals whose frequencies are respectively identical to the frequencies of the above-mentioned loop coils or resonators, a frequency control section 35 for controlling the resonance frequency signal generating section 34 in order to generate a plurality of resonant frequency signals according to a predetermined order, a switching section 36 for switching a transmission and a reception setting, and a switching signal generating section 37 for controlling the switching operation of the switching section 36. The calculation section 32, the processing section 33, the frequency control section 35 and the switching signal generation section 37 are realized as a function means by means of a microcomputer.

The switching section 36 includes a transmission terminal (T), a reception terminal (R), and a movable terminal connected to the cable 21 and selectively connected to either one of the transmission or reception terminals. The coordinate detecting section 31 comprises a reception signal amplifier 31a for amplifying reception signals sent through the reception terminal R, and a synchronizing signal detector 31b for detecting the signal that resonates most intensely in the resonance unit 15, and for outputting the strength signal s1 and the phase signal s2 of the detected signal. The resonance frequency signal generating section 34 comprises a frequency synthesizer 34a for successively outputting signals s4 having resonant frequencies that are respectively identical to the resonant frequencies of the plurality of loop coils 17x and 17y on the basis of a frequency control signal provided from the frequency control section 35, and a transmission signal amplifier 34b for amplifying signals s4 outputted from the frequency synthesizer 34a, and for sending them to the transmission terminal T of the switching section 36. The signals s4 are supplied to the synchronizing signal detector 31b as a reference signal. The switching operation in the switching section 36 is determined by a switching signal s5 supplied from the switching signal generation section 37.

Data outputted from the processing section 33 in the control unit 22 are supplied to a display unit 42 through a cable 41. The result obtained in the process by means of the application program that is executed in the processing section 33 is displayed on a screen 42 of the display unit 42.

A position information input operation executed in the digitizer of the present embodiment, that is, a position detecting method, will be explained by referring to FIGS. 1–3 and FIG. 4 showing a flowchart.

For an operator to adequately indicate a position on the X and Y coordinate input surface 11 of the coordinate plane board 12 by using the pen-type position indicating device 13, the tip of the core shaft 26 is contacted with and pressed against the surface 11 at the position to be indicated with suitable pressure. This operation causes the core shaft 26 to move back in the position indicating device 13 and switch the switch 25 ON. When the switch 25 becomes ON and the movable terminal is connected to the transmission terminal T in the switching section 36, the AC signal supplied from the resonance frequency signal generating section 34 of the control unit 22 is supplied to the antenna coil 24 through the switch 25 to emit an electromagnetic wave to the X and Y coordinate input surface 11 of the coordinate plane board 12. On the other hand, when the movable terminal is connected to the reception terminal R in the switching section 36, an AC signal induced in the antenna coil 24 is supplied to the coordinate detecting section 31 through the switch 25. The AC signal is induced by the electromagnetic coupling operation between the antenna coil 24 and each of a plurality of loop coils 17x and 17y in the resonance unit 15, which occurs in the case where the frequency of the electromagnetic wave emitted from the antenna coil 24 substantially equals the specific resonant frequency of the loop coils. The coordinate detecting section 31 detects the signal strength of the AC signal being synchronized with the AC signal supplied to the antenna coil 24, and the phase difference between the two AC signals, and sends signals corresponding to the strength and the phase difference to the calculation section 32. The calculation section 32 calculates coordinate data for the position indicated by the position indicating device 13 by using data as to the signal strength and phase difference of the inputted AC signal.

The resonance frequency signal generating section 34 in the control unit 22 is controlled by the frequency control section 35 to successively output signals each having a predetermined frequency corresponding to a resonance frequency of each of the loop coils 17x and 17y. All of the signals outputted from the resonance frequency signal generating section 34 are sent to the antenna coil 24 in the pen-type position indicating device 13. It is supposed that the total amount of the loop coils 17x and 17y is determined to be N and the resonance frequency of each of the loop coils is determined to be $f_i(i=0 \sim N-1 : f_0 \sim f_{N-1})$. In this case, the resonance frequency signal generating section 34 outputs successively the AC signals respectively having the frequency $f_0 \sim f_{N-1}$ based on the control signal s3 supplied from the frequency control section 35 in order to supply them to the antenna coil 24 of the pen-type position indicating device 13 through the switching section 36. To explain in detail, whenever the resonance frequency signal generating section 34 outputs AC signal of a frequency $f_i$, first of all, the movable terminal is connected to the transmission terminal in the switching section 36 in accordance with the switching signal s5 outputted from the switching signal generation section 37. This allows the AC signal of the frequency $f_i$ to be sent to the antenna coil 24 through the switch 25 which is switched ON allowing to make the electromagnetic wave of frequency $f_i$ to be emitted from the antenna coil. Subsequently the movable terminal is changed to be connected to the reception terminal in the switching section 36 based on the switching signal S5 so that the AC signal induced by the resonance due to the electromagnetic wave is sent into the coordinate detecting section 31 through the switch 25.

Figure 4:
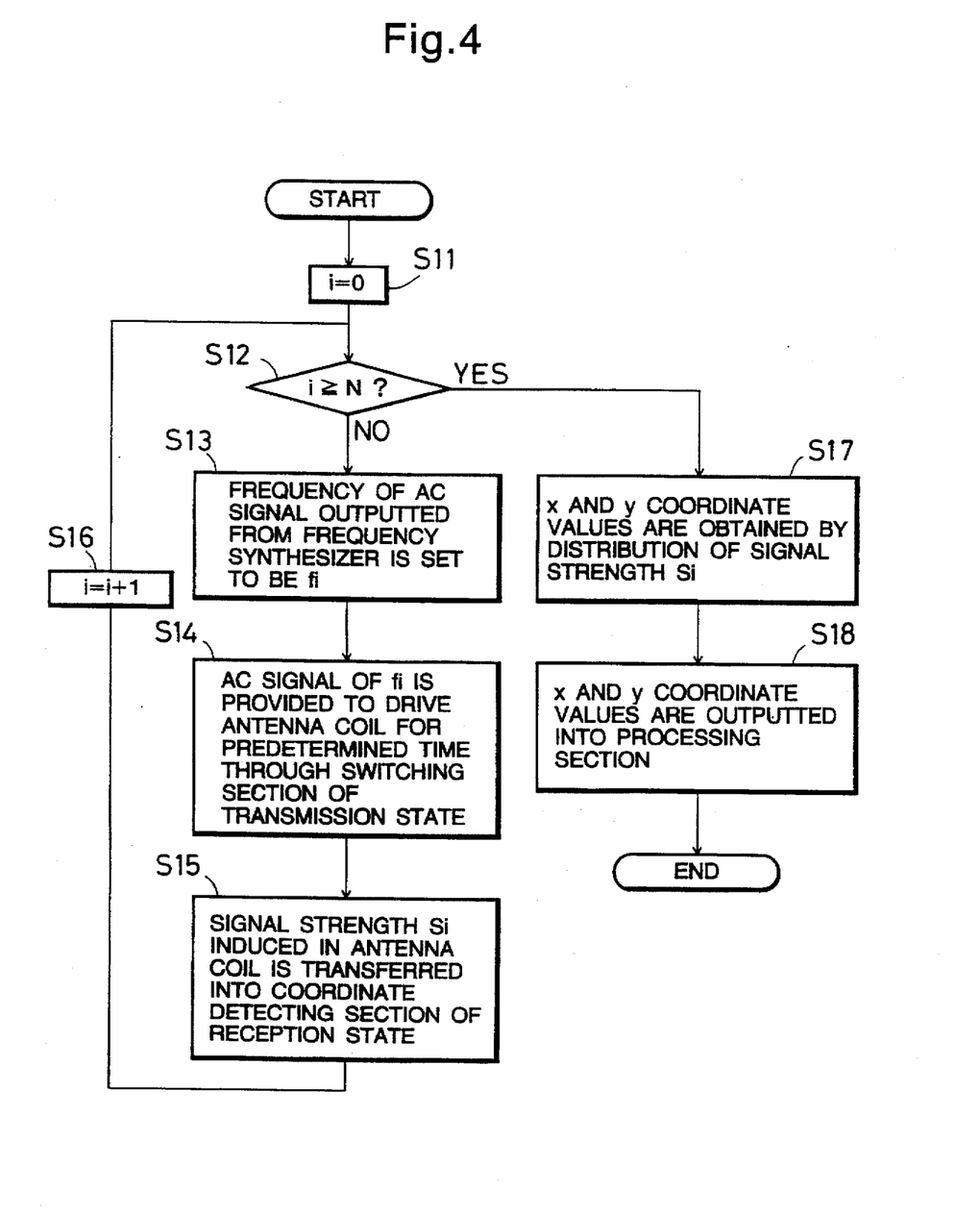
FIG. 4 is a flowchart explaining operation of inputting position information.

The above-mentioned position information input operation will be explained in detail by referring to FIG. 4. In the resonance frequency signal generating section 34, the frequency synthesizer 34a is controlled by the frequency control section 35 so as to output the AC signals of the resonance frequency $f_i(i=0\sim N-1)$, that is, $f_0, \ldots, f_i, \ldots, f_{N-1}$ respectively during a predetermined time. "i" is set to be zero in step S11 and it is judged whether "i" is larger than N or not (step S12). When "i" is smaller than N, the frequency of the AC signal outputted from the frequency synthesizer 34a is set to be $f_i$ (step S13). When "i" is equal to zero, $f_i$ is to be $f_0$. The AC signal of the frequency $f_0$ is sent to the antenna coil 24 through the switching section 36 and the cable 21 when the moveable terminal of the switching section 36 is connected to the transmission terminal (T) based on the switching signal s5. When the pen is pushed down and the switch 25 is ON in the pen-type position indicating device 13, the antenna coil 24 can be driven by the AC signal of frequency $f_0$ during a definite period of time to emit an electromagnetic wave of frequency $f_0$ (step S14).

The electromagnetic wave of frequency $f_0$ emitted from the antenna coil 24 in the pen-type position indicating device 13 provides the electromagnetic coupling with the resonance unit 15 installed in the coordinate plane board 12. There occurs an electromagnetic coupling between the antenna coil 24 and the loop coils 17x and 17y each of which is nearest to the position indicated by the pen-type position indicating device 13 on the X and Y coordinate input surface 11 of the coordinate plane board 12. The electromagnetic coupling phenomena causes the nearest loop coils 17x and 17y to resonate, and the resonance operation in the nearest loop coils 17x and 17y reversely induces an alternating current or an AC signal in the antenna coil 24. Signal strength Si of the induced AC signal is determined by the strength of the electromagnetic coupling, that is, the extent of the strength of the resonance action. The closer that the frequency of the emitted electromagnetic wave coincides with the resonance frequency of the nearest loop coil, the stronger the AC signal that can be induced. In step S15, when the connection to the reception terminal (R) in the switching section 36 is formed by the switching signal s5 provided from the switching signal generating section 37, the strength signal Si of the AC signal induced in the antenna coil 24 is transferred into the coordinate detecting section 31 through the switch 25, the cable 21 and the switching section 36.

After steps S12–S15 for the AC signal of the frequency $f_0$ are executed, steps S12–S15 are executed again with incrementing "i" to "i+1" in step S16, and further the same action will be repeated for the remaining AC signals of frequency $f_3, f_4, \ldots, f_{N-1}$.

While the pen-type position indicating device 13 indicates any place in the X and Y coordinate input surface 11, the AC signals of the frequency $f_0, \ldots, f_{N-1}$ outputted from the resonance frequency signal generating section 24 are supplied to the antenna coil 24 of the pen-type position indicating device 13 at least once. Whenever every AC signal is supplied to the antenna coil 24, every strength signal $S_0, \ldots, S_{N-1}$ of the AC signals induced in the antenna coil 24 on the basis of the electromagnetic coupling are sent into the coordinate detecting section 31 by switching the switching section 36. Each time the AC signal is given to the antenna coil 24, the synchronizing signal detector 31b in the coordinate detecting section 31 receives the AC signal induced in the antenna coil 24 on the basis of the electromagnetic coupling due to the AC signal given to the antenna coil 24, and outputs the signal s1 of the strength (Si) and the signal s2 of the phase to the calculation section 32, by using the reference signal s4 supplied from the frequency synthesizer 34a.

In the calculation section 32, the signal s1 as to the strength Si sent from the synchronizing signal detector 31b is stored in memory and a peak value in the distribution on the signal strengths Si (i=0~N−1) is calculated by interpolation, and further x and y coordinates of the position indicated by the position indicating device 13 are calculated by the use of position data for the loop coils having a resonance frequency identical to the signal frequency corresponding to the peak value (step S17). The obtained x and y coordinate values are outputted into the processing section 33 (step S18) and are used as the coordinate value required in an application program executed in the processing section 33.

In the process for calculating the x and y coordinate value, signal phase data may be used instead of the peak value of the signal strength. In this case, the position data of the loop coils having the resonance frequency identical to the signal frequency having the smallest phase difference may be used.

In the case that the control unit has obtained the information as to the coordinate values of the position first indicated by the position indicating device 13, the above-mentioned scanning process for obtaining the coordinate data of the subsequent positions which will be indicated thereafter can be altered so that the AC signals supplied to the antenna coil 24 are limited to those having respectively the frequencies identical to the resonance frequencies of the loop coils 17x and 17y which are located in the vicinity of the first indicated position.

According to the above-mentioned embodiment, forming the coordinate plane board 12 into a passive-type structure causes the board 12 to not require a power source or other active circuit components, and therefore the coordinate plane board 12 can be manufactured in a simple and light configuration.

In the embodiment, the AC signals of the different frequencies $f_0, \ldots, f_{N-1}$ are sequentially supplied to the antenna coil 24 to sequentially emit the electromagnetic waves of the different frequencies therefrom. On the other hand, all of the AC signals may be simultaneously supplied to the antenna coil 24 in order to simultaneously emit all of the electromagnetic waves of the different frequencies. In this case, the coordinate detecting section 31 receives all of the induced AC signals of the different frequencies simultaneously and the AC signal having the largest amplitude can be used for calculating the coordinate values.

Next, another embodiment of the computer system including the digitizer of the present invention will be explained by referring to FIGS. 5 and 6. In this embodiment, the above-mentioned pen-type position indicating device is produced as a pen-type computer 51 by enlarging its functions, and hence is equipped with portions respectively corresponding to the control unit 22 and the display unit 42.

The ferrite core 23, the core shaft 26, the switch 25 and the antenna coil 24, which have been illustrated in FIG. 2, are arranged in the front end portion of the pen-type computer 51. Further, the pen-type computer 51 has a coordinate detecting controller 52 and a computer 53 disposed within it, and further, an LCD display unit 54 is disposed at its rear or top end. The coordinate detecting controller 52 essentially consists of the switching section 36, the coordinate detecting section 31, the resonance frequency signal generating section 34, the frequency control section 35, and the switching signal generation section 37. Also, the computer 53 includes the calculation section 32 and the processing section 33. The LCD display unit 54 is substantially identical to the display unit 42 shown in FIG. 1 with respect to function. Further, the configuration of the coordinate plane board 12 is as illustrated in FIG. 1.

Figure 5:
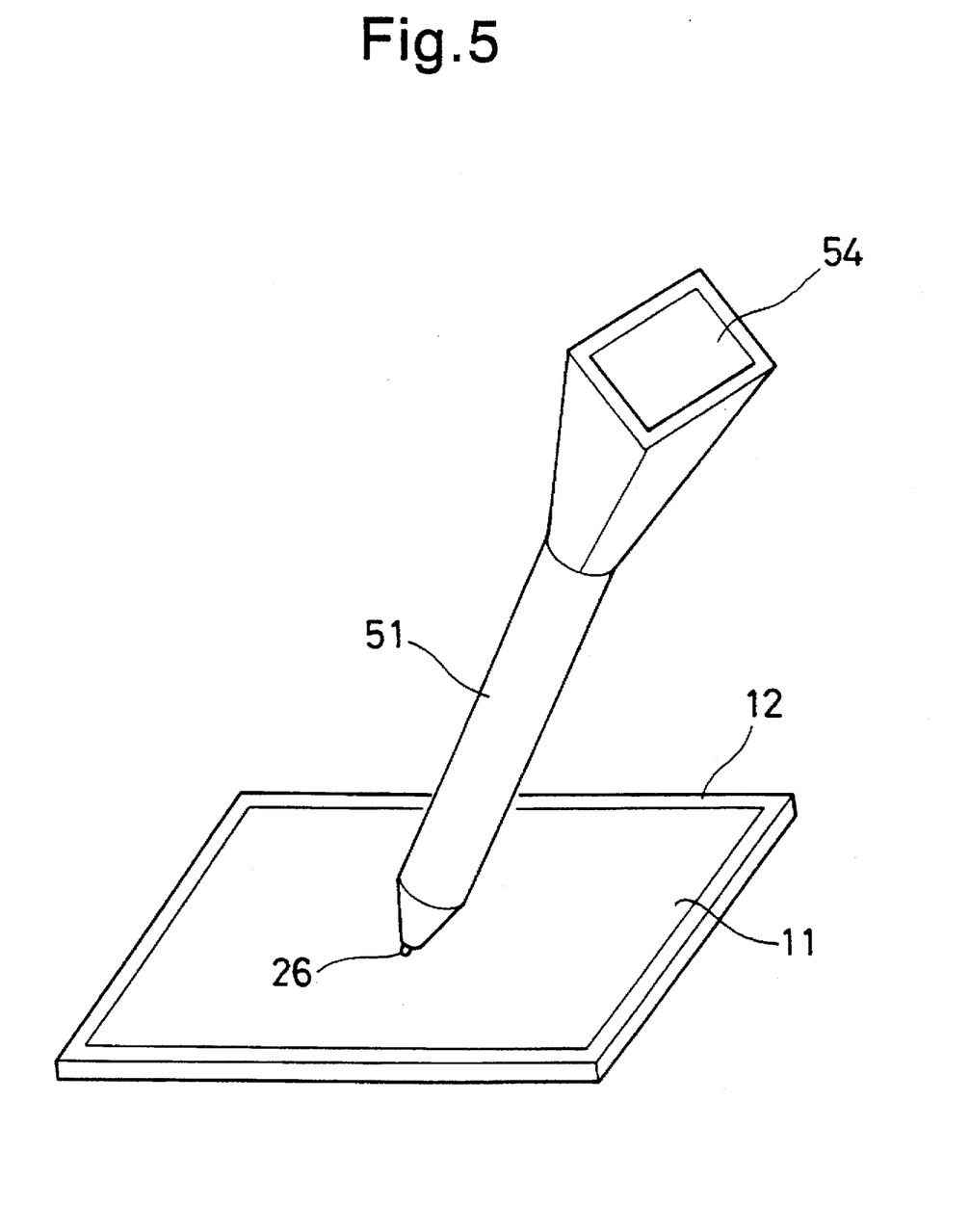
FIG. 5 is a perspective view showing another embodiment of the computer system including the digitizer of the present invention.
Figure 6:
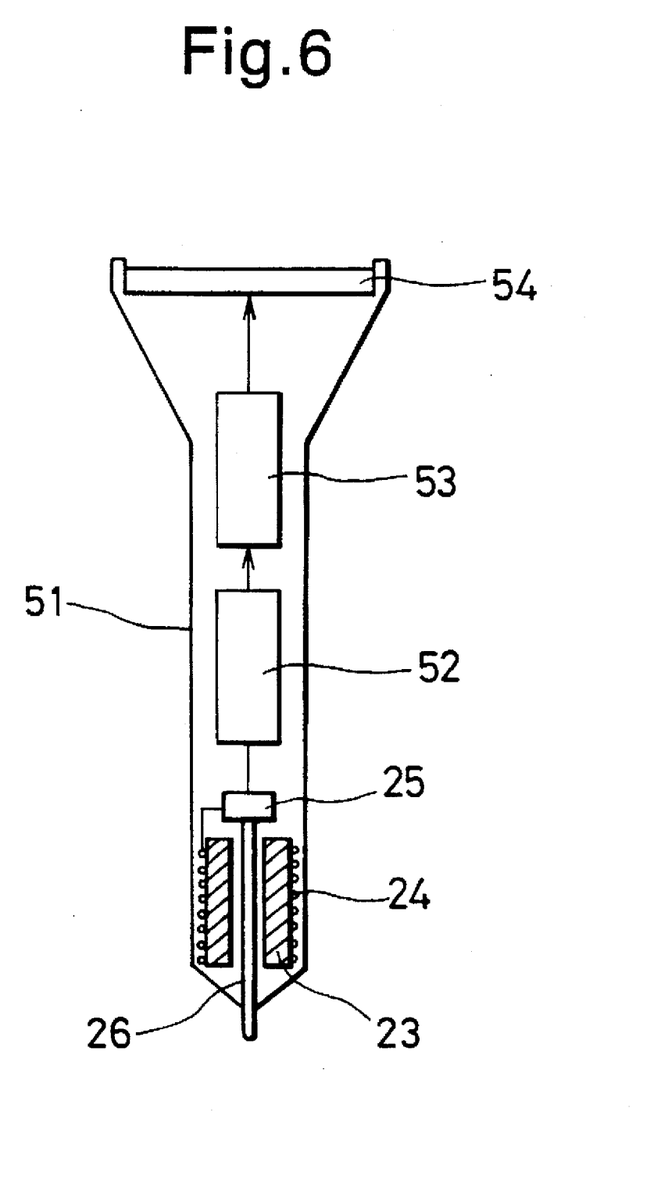
FIG. 6 is a view illustrating an internal configuration of a pen-type computer shown in FIG. 5.

According to the digitizer shown in FIGS. 5 and 6, all of the essential components necessary for the digitizer, such as the coordinate detecting controller 52, computer 53, and LCD display unit 54 and the like are arranged in a position indicating device, and hence this position indicating device can be configured as a pen-type computer 51 so as to cause it to have an intelligent ability. Accordingly, the digitizer of this embodiment can be manufactured to be compact and have improved operability.

Figure 7:
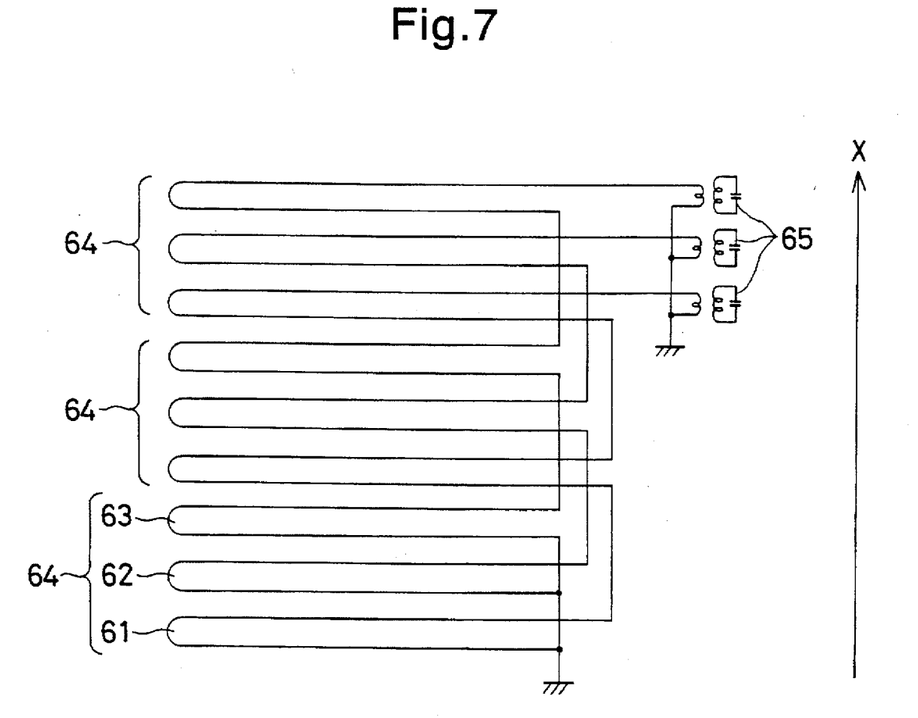
FIG. 7 is a diagrammatic view illustrating another arrangement of the loop coils.

The above-mentioned embodiment of the present invention can be altered as follows. As shown in FIG. 7, a plurality of loop coils can be divided into groups 64 consisting of three loop coils 61, 62, 63 respectively having different resonance frequencies from each other and arranged in the direction of the X coordinate axis, and a plurality of groups 64 can be arranged in the X coordinate axis direction by placing three loop coils 61–63 repeatedly. The loop coils that respectively belong to the different groups and which have identical resonance frequencies can be connected in series, and further, the end of the series circuit of to the loop coils is connected with a resonator 65 whose resonance frequency is identical to the one of the loop coils included in the circuit. The example shown in FIG. 7 shows only three groups 64, for example. However, in the actual configuration there may be more or less than three. Naturally, the configuration comprising loop coils and resonators is also arranged in a Y coordinate axis direction in the same manner as the configuration for the X coordinate axis direction. In this case, the respective resonators for the Y coordinate axis direction have resonance frequencies different from those of the resonators for the X coordinate axis directions.

Figure 8:
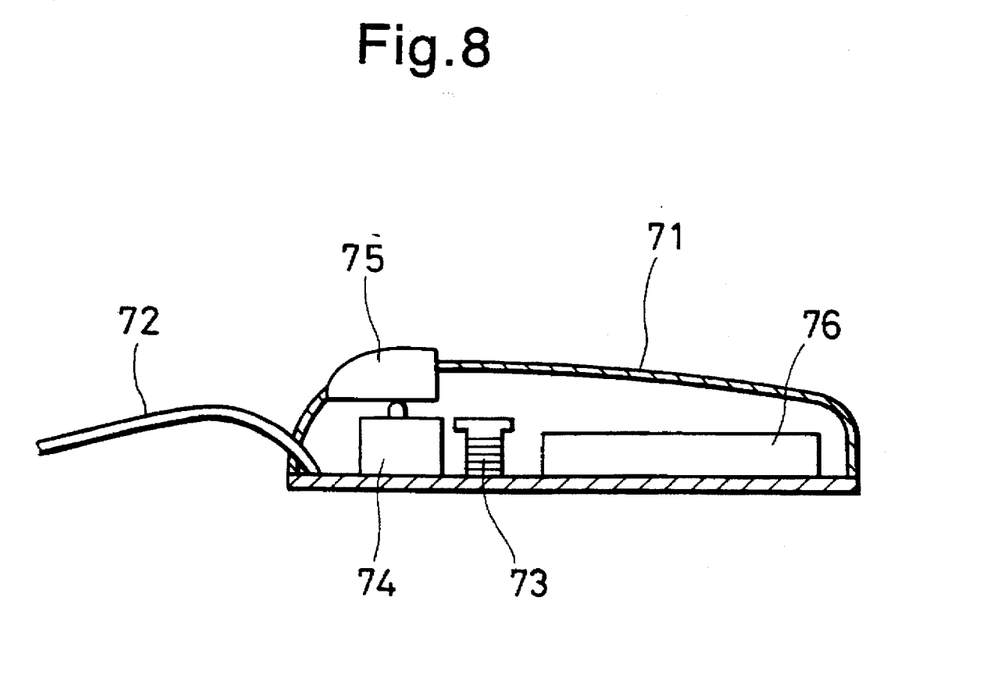
FIG. 8 is a view illustrating an internal configuration of a mouse-type position indicating device; and, FIG. 9 is a perspective view illustrating another embodiment of a combination of the pen-type computer and the coordinate plane board.

According to the above-mentioned configuration, it is possible to obtain the coordinate values of positions on the coordinate plane board as relative coordinate values, which will be indicated by using a mouse-type position indicating device as shown in FIG. 8. This configuration has the merit of simplicity because the number of the resonators can be decreased.

The mouse-type position indicating device 71 shown in FIG. 8 may be used as the input device for the digitizer in place of the pen-type position indicating device 13. The mouse-type position indicating device 71 should be desirably used on the coordinate plane board that is configured to obtain the above-mentioned relative coordinate values. The mouse-type position indicating device 71 is connected to the computer through a cable 72. The position indicating device 71 includes an antenna coil 73, a switch element 74 used for supplying an AC signal to the antenna coil 73 and for transmitting an AC signal induced in the antenna coil 73, a button element 75 for operating the switch element 74, and a coordinate detection control section 76 for generating the AC signal to be supplied to the antenna coil 73 and calculating the coordinate values by using the induced AC signal given from the antenna coil 73. Further, the coordinate detection control section 76 has the switching section 36, the coordinate detecting section 31, the resonance frequency signal generating section 34, the frequency control section 35 and the switching signal generation section 37. The functions of the mouse-type position indicating device 71 are equal to those of the pen-type position indicating device and in the former the button operation element 75 is operated in place of pushing down the pen in the latter. In the case of the digitizer operating by obtaining the relative coordinate values, the coordinate detection control section 76 may obtain the relative coordinate values based on a calculation of the positional changes about the positions indicated on the coordinate input surface.

Figure 9:
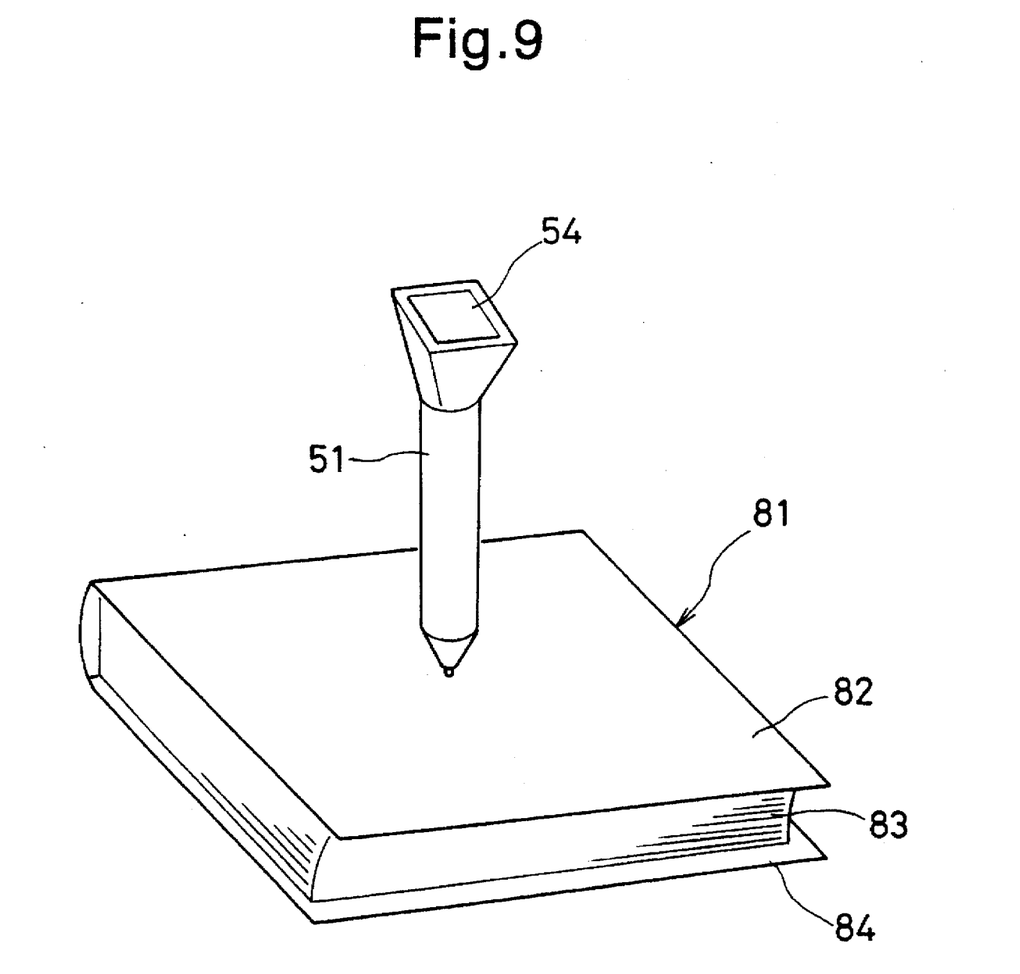

FIG. 9 shows another example of the coordinate plane board that has a desirable configuration for practical usage. In this embodiment, the pen-type computer 51 is used as a position indicating device. A front cover portion of a note book 81 is equipped with the coordinate plane board. For example, the coordinate plane board 15 shown in FIG. 3 is incorporated with the front cover portion 82 of the note look 81. A portion 83 indicates papers for the note book 81. A shield plate 84 is also arranged in the rear cover portion of the note look 81. This shield plate 84 is disposed apart from the coordinate plane board arranged in the front cover portion 82 at a suitable distance and prevents generation of induced currents due to external noise. Further the coordinate plane board can be incorporated into books, pocket notebooks, book covers and so on.

The position indicating device may also has a bar-code reader, an optical code reader and the like disposed within it.

The technical advantages of the present invention are as follows. The coordinate plane board has a simple construction without a power source and active circuit components, and can therefore be very light, because it is configured in a passive manner. The digitizer including such a coordinate plane board can be manufactured at a relatively low cost. In addition, the position indicating device can have the control section, the coordinate detection section, the coordinate value calculation section and the processing section executing the application programs within it thus making it as an intelligent unit.

Further, since all of sections necessary for producing the coordinate data about the indicated positions are included in the position indicating device, there is no need to provide specific communication between the position indicating device and the coordinate plane board, and therefore the digitizer of the present invention can be improved to have high reliability and economical efficiency.

What is claimed is:

1. A digitizer used as an input device for a computer system, comprising:

a coordinate board with a two-dimensional coordinate plane defined thereon for use as an input board, there being configured therein a plurality of resonant loop coils along each of two coordinate axes, whose resonant frequencies are mutually different, said loop coils resonating by electromagnetic coupling;

a position indicating device including an antenna coil to be electromagnetically coupled with any of said loop coils, said position indicating device being operated on said two-dimensional coordinate plane;

an AC power supply for supplying said antenna coil with AC power, the frequency of which is varied to match resonant frequencies of each of the plurality of loop coils;

signal detecting means for detecting an AC signal generated by an induction effect due to said electromagnetic coupling in said antenna coil, thereby sensing a resonant signal in any one of the plurality of loop coils; and, processing means for controlling operations of said AC power supply and signal detecting means, and for calculating coordinate values of positions pointed out by said position indicating device on said coordinate board by using signals outputted from said signal detecting means.

2. A digitizer according to claim 1, wherein the plurality of loop coils includes at least three loop coils whose resonant frequencies are mutually different, and which are arranged in a repeating pattern.

3. A digitizer according to claim 1, wherein each of the loop coils is connected with a resonator whose resonant frequency is identical with the resonant frequency of the connected loop coil.

4. A digitizer according to claim 1, wherein said two coordinate axes are X and Y axes perpendicularly intersecting each other, and said plurality of loop coils are arranged along each of the X and Y axes.

5. A digitizer according to claim 1, wherein said frequency of said AC power supplied to said antenna coil is varied sequentially to match the resonant frequency of each loop coil of said plurality of loop coils one after the other.

6. A digitizer according to claim 1, wherein a plurality of all frequencies of said AC power that match said resonant frequency of each loop coil of said plurality of loop coils are supplied to said antenna coil simultaneously.

7. A digitizer according to claim 1, wherein said AC power supply, said signal detecting means, and said processing means are incorporated into said position indicating device.

8. A digitizer according to claim 7, wherein said position indicating device contains a computer unit including said processing means, and a display section for displaying a result obtained through a process in said processing means.

9. A method of detecting positions performed in a digitizer, comprising the steps of:

moving a position indicating unit including an antenna coil on a coordinate plane board in which a plurality of resonant loop coils having respectively a resonating action based on unlike resonance frequencies are arranged along at least one coordinate axis, said antenna coil being able to be electromagnetically coupled with each of the plurality of resonant loop coils;

supplying said antenna coil with a plurality of AC signals whose frequencies are respectively identical to resonant frequencies of the plurality of resonant loop coils in order to activate said antenna coil;

retrieving an AC signal induced in said antenna coil owing to any one of the plurality of resonant loop coils which performs the resonating action based on the electromagnetic coupling;

detecting a state of the induced AC signal; and calculating coordinate values of positions indicated by the position indicating unit on the coordinate plane board by using the state of the AC signal.

10. A method of detecting positions according to claim 9, wherein each of the plurality of loop coils is connected with a resonator whose resonant frequency is identical with the resonant frequency of the connected loop coil.

11. A method of detecting positions according to claim 9, wherein said frequency of said AC signals supplied to said antenna coil is varied sequentially to match the resonant frequency of each resonant loop coil of said plurality of resonant loop coils one after the other.

12. A method of detecting positions according to claim 9, wherein a plurality of all frequencies of said AC signals that match said resonant frequency of each resonant loop coil of said plurality of resonant loop coils are supplied to said antenna coil simultaneously.

13. The digitizer of claim 1, wherein the plurality of resonant loop coils are passive.

14. The digitizer of claim 1, wherein the AC power supply supplies AC power only to the antenna coil.

15. The digitizer of claim 1, wherein the AC power supply, signal detecting means, and processing means are connected to the position indicating device.

* * * * *